US005746570A

United States Patent [19]

Gujda et al.

[11] Patent Number: 5,746,570

[45] Date of Patent: May 5, 1998

[54] APPARATUS FOR POSITIONING A HANDLE OF A PAIL FOR A PRINTING OPERATION ON THE PAIL

[75] Inventors: Mieczyslaw Gujda, Elmwood Park; Pieter S. van der Griendt, Far Hills; James W. Dominico, West Paterson, all of N.J.

[73] Assignee: Polytype America Corporation, Union City, N.J.

[21] Appl. No.: 730,350

[22] Filed: Oct. 15, 1996

[51] Int. Cl.$^6$ .......... B65G 59/10

[52] U.S. Cl. .......... 414/795.6; 414/798.9; 156/446

[58] Field of Search .......... 414/757, 795.6, 414/798.9, 910; 156/446; 72/283; 269/909; 198/461.1, 461.2; 221/236, 224, 251, 270

[56] References Cited

U.S. PATENT DOCUMENTS

| | | | |
|---|---|---|---|
| 3,299,914 | 1/1967 | Harmon | 141/82 |
| 3,492,785 | 2/1970 | Mancini | 53/282 |
| 3,640,408 | 2/1972 | Adams | 414/798.9 |
| 3,661,075 | 5/1972 | Amberg | 414/798.9 |
| 4,221,286 | 9/1980 | Galer et al. | 198/377 |
| 4,372,102 | 2/1983 | McWilliams | 53/474 |
| 4,392,565 | 7/1983 | Strauch | 198/378 |
| 4,498,573 | 2/1985 | Anderson et al. | 414/791.7 |
| 4,591,403 | 5/1986 | Von-Meyer | 156/446 |
| 4,636,278 | 1/1987 | Wesley | 156/446 |
| 4,948,011 | 8/1990 | Mueller et al. | 414/795.6 |
| 4,967,930 | 11/1990 | Koltze | 414/795.6 |
| 4,983,098 | 1/1991 | Heisler | 414/798.9 |
| 4,991,741 | 2/1991 | Anderson | 414/795.6 |
| 5,547,335 | 8/1996 | Lovett et al. | 414/795.6 |
| 5,551,828 | 9/1996 | Hes | 414/757 |

*Primary Examiner*—Karen B. Merritt
*Assistant Examiner*—Douglas A. Hess
*Attorney, Agent, or Firm*—Richard M. Goldberg

[57] ABSTRACT

An apparatus for positioning a handle of a pail for a printing operation on the pail, includes a mandrel assembly for rotatably supporting a pail thereon, the mandrel assembly including a backstop; a first stopper mechanism for restraining second and subsequent pails of a stack; a puller mechanism movably mounted on a track and including a pulling arm for pulling a first pail of the stack from the stack while the first stopper mechanism holds the second and subsequent pails of the stack; a brush roller mounted in contact with a free end of a handle of the first pail of the stack; a motor rotating the brush roller to move the handle of the first pail to a first position out of engagement with remaining pails of the stack; a temporary holding device positioned at the first position which releasably holds the handle in the first position, and releases the handle after disengagement of the first pail from the stack; a pusher mechanism movably mounted on the track and including a pusher arm for engaging a bottom of the removed first pail and pushing the removed first pail onto the mandrel assembly; a retainer band mounted to the backstop; and a helix member mounted to the backstop at a different position and engaging a handle of the first pail during rotation of the first pail on the mandrel assembly to automatically move the handle to a position within and releasably engaged by the retainer band.

20 Claims, 9 Drawing Sheets

APPARATUS FOR POSITIONING A HANDLE OF A PAIL FOR A PRINTING OPERATION ON THE PAIL

BACKGROUND OF THE INVENTION

The present invention relates generally to container printing apparatus, and more particularly, is directed to an apparatus for positioning a handle of a pail for a printing operation on the pail.

In order to print on the cylindrical outer surface of a pail having a handle, it is necessary to move and keep the handle away from, that is, forwardly displaced, from the cylindrical surface.

Conventionally, with metal handles, magnets have been used on the backing plate of the mandrel assembly, to hold the handle in position. However, metal handles have been replaced with plastic handles, so that such magnets are ineffective.

Therefore, it has been known to use a rigid member on the backing plate, for holding the handle in position for printing. To position the handle, a pusher has been provided at the sides of the pail, to orient the handle forwardly of the upper edge of the pail. Then, as the pail is pushed forward, the forwardly oriented handle hits the backing plate at a position below the rigid member. Upon continued loading of the pail onto the mandrel, the handle slides up along the backing plate and is trapped under the rigid member.

Thereafter, the turret which holds a plurality of such mandrels is rotated, so that the mandrel and pail are moved to the next position for printing, with the handle trapped under the rigid member.

A problem with such apparatus, however, is that the handle must be dragged forwardly of the pail in order to trap it under the rigid member.

Further, since the pushers for pushing the handle forwardly of the pail are at the sides of the pail, there is a problem if the pushers fail. For example, if the air cylinder of a pusher fails, so that it does not move back after pushing the handle, rotation of the turret will move the mandrel and pail into the air cylinder, destroying the same, and causing major downtime of the machine.

Another problem is with removal of the pail. Specifically, the handle must be dragged out in the same manner that it was pushed in.

Still further, when removing a first pail from a stack of pails in order to position the first pail on a mandrel assembly, the handle of the first pail is generally positioned rearwardly. As a result, the handle of the first pail may catch on the lip of a rearwardly positioned pail, causing problems with the disengagement.

OBJECTS AND SUMMARY OF THE INVENTION

Accordingly, it is an object of the present invention to provide an apparatus for positioning a handle of a pail for a printing operation on the pail, that overcomes the aforementioned problems.

It is another object of the present invention to provide an apparatus including a helix member for moving a handle of a pail out of the way for a printing operation on the pail, without the need for any pusher mechanism for the handle. Thus, the problem of a pusher mechanism failing and causing much damage is avoided.

It is still another object of the present invention to provide an apparatus for removably holding the handle out of the way on a mandrel assembly by means of a flexible spring steel member. Thus, by means of easy deformation, the handle is easily removed from the flexible spring steel member.

It is yet another object of the present invention to provide an apparatus for positioning a handle of a first pail in a stack of pails to prevent engagement of the handle with subsequent pails of the stack, during disengagement of the first pail from the stack.

In accordance with an aspect of the present invention, an apparatus for positioning a handle of a pail for a printing operation on the pail, includes a mandrel assembly for rotatably supporting a pail thereon, the mandrel assembly including a backstop; a retainer band mounted to the backstop; and a helix member mounted to the backstop at a position different from the retainer band and engaging a handle of the pail during rotation of the pail on the mandrel assembly so as to automatically move the handle to a position within and releasably engaged by the retainer band.

Preferably, the helix member extends around an arc slightly larger than the diameter of the specific size pail that is being rotatably supported by the mandrel assembly.

In addition, a first block is provided for securing one end of the helix member to the backstop and a second block is provided for securing an opposite end of the helix member to the backstop, with the first block having a height greater than a height of the second block such that a distance of the one end of the helix member to the backstop is greater than a distance from the opposite end of the helix member to the backstop.

In one embodiment, the helix member is in the shape of a rod. In another embodiment, the helix member is in the shape of a flat plate. Also,, the helix member has an input end that is bent outwardly with respect to a remainder of the helix member.

The retainer band is a flexible spring member that is formed in an arcuate configuration. Preferably, the retainer band is formed as a flat spring steel member that is bent into the arcuate configuration, and includes retainer members at opposite ends thereof for securing the retainer band in the bent, arcuate configuration to the backstop.

Preferably, the helix member is positioned at a lower portion of the backstop, and the retainer band is positioned at an upper portion of the backstop.

Also, a front plate secured to the backstop, with the retainer band and the helix member mounted to the backstop via the front plate.

In accordance with another aspect of the present invention, an apparatus is provided for positioning a handle of a first pail in a stack of pails to prevent engagement of the handle with subsequent pails of the stack, during disengagement of the first pail from the stack, the apparatus including a brush roller mounted in contact with a free end of a handle of a first pail of a stack of pails; a motor connected with the brush roller for rotating the brush roller so as to move the free end of the handle of the first pail to a first position out of engagement with remaining ones of the pails of the stack; and a temporary holding device positioned at the first position which releasably holds the handle in the first position, and releases the handle of the first pail after disengagement of the first pail from the stack.

Preferably, the pails of the stack are oriented in a first direction, and the handle of the first pail temporarily held in the first position is oriented in a second direction substantially transverse to the first direction.

The temporary holding device includes a plurality of spring fingers extending vertically down from a support at the first position.

In accordance with still another aspect of the present invention, a apparatus for positioning a handle of a pail for a printing operation on the pail, includes a mandrel assembly for rotatably supporting a pail thereon, the mandrel assembly including a backstop; a first stopper mechanism positioned adjacent a stack of pails for restraining a second pail and subsequent pails of the stack; a track extending at least from the stack of pails to the mandrel assembly; a puller mechanism movably mounted on the track and including a pulling arm for engaging a first pail of the stack and pulling the first pail from the stack while the first stopper mechanism holds the second pail and subsequent pails of the stack; a brush roller mounted in contact with a free end of a handle of the first pail of the stack; a motor connected with the brush roller for rotating the brush roller so as to move the free end of the handle of the first pail to a first position out of engagement with remaining ones of the pails of the stack; a temporary holding device positioned at the first position which releasably holds the handle in the first position, and releases the handle of the first pail after disengagement of the first pail from the stack; a pusher mechanism movably mounted on the track and including a pusher arm for engaging a bottom of the first pail of the stack which has been removed by the puller mechanism and pushing the removed first pail onto the mandrel assembly; a retainer band mounted to the backstop; and a helix member mounted to the backstop at a position different from the retainer band and engaging a handle of the first pail during rotation of the first pail on the mandrel assembly so as to automatically move the handle to a position within and releasably engaged by the retainer band.

The above and other objects, features and advantages of the invention will become readily apparent from the following detailed description thereof which is to be read in connection with the accompanying drawing.

DETAILED DESCRIPTION OF THE PREFERRED EMBODIMENTS

Figure 1:
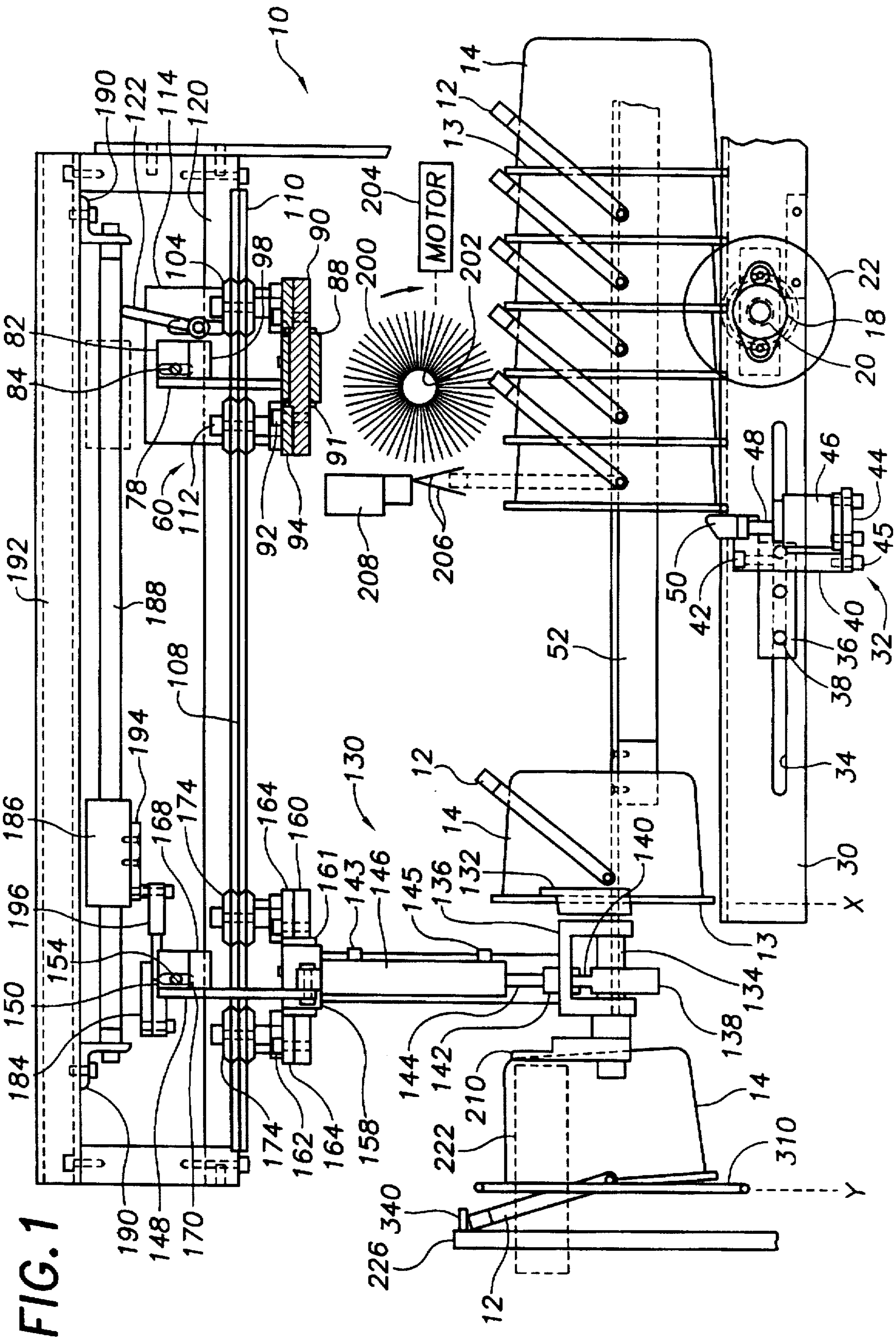
FIG. 1 is a side elevational view, partly in section, of apparatus according to the present invention for moving the handle of a pail out of the way during printing.
Figure 2:
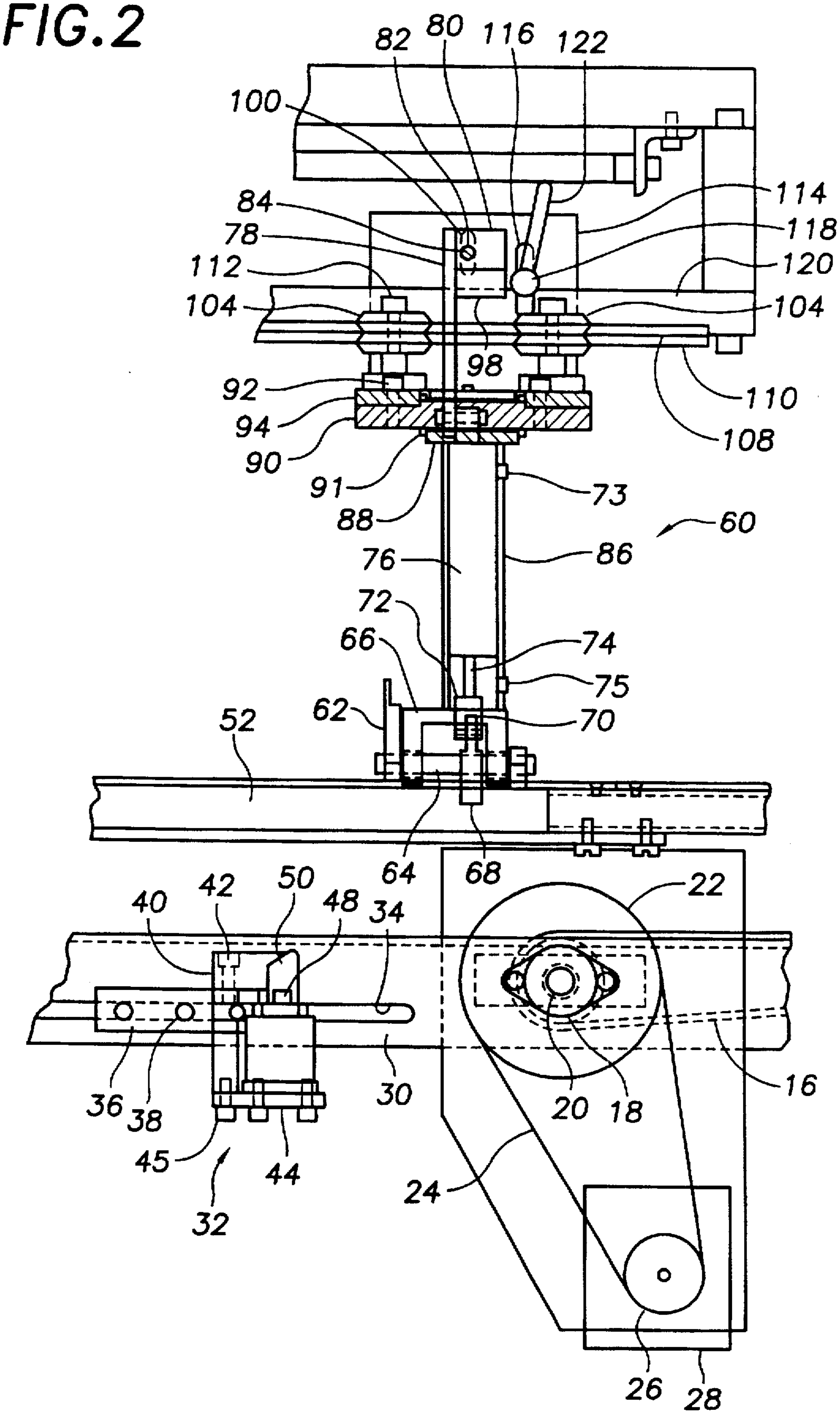
FIG. 2 is a side elevational view, partly in section, of a portion of the apparatus of FIG. 1, showing the conveyor drive and upper stopper mechanism in more detail.
Figure 3:
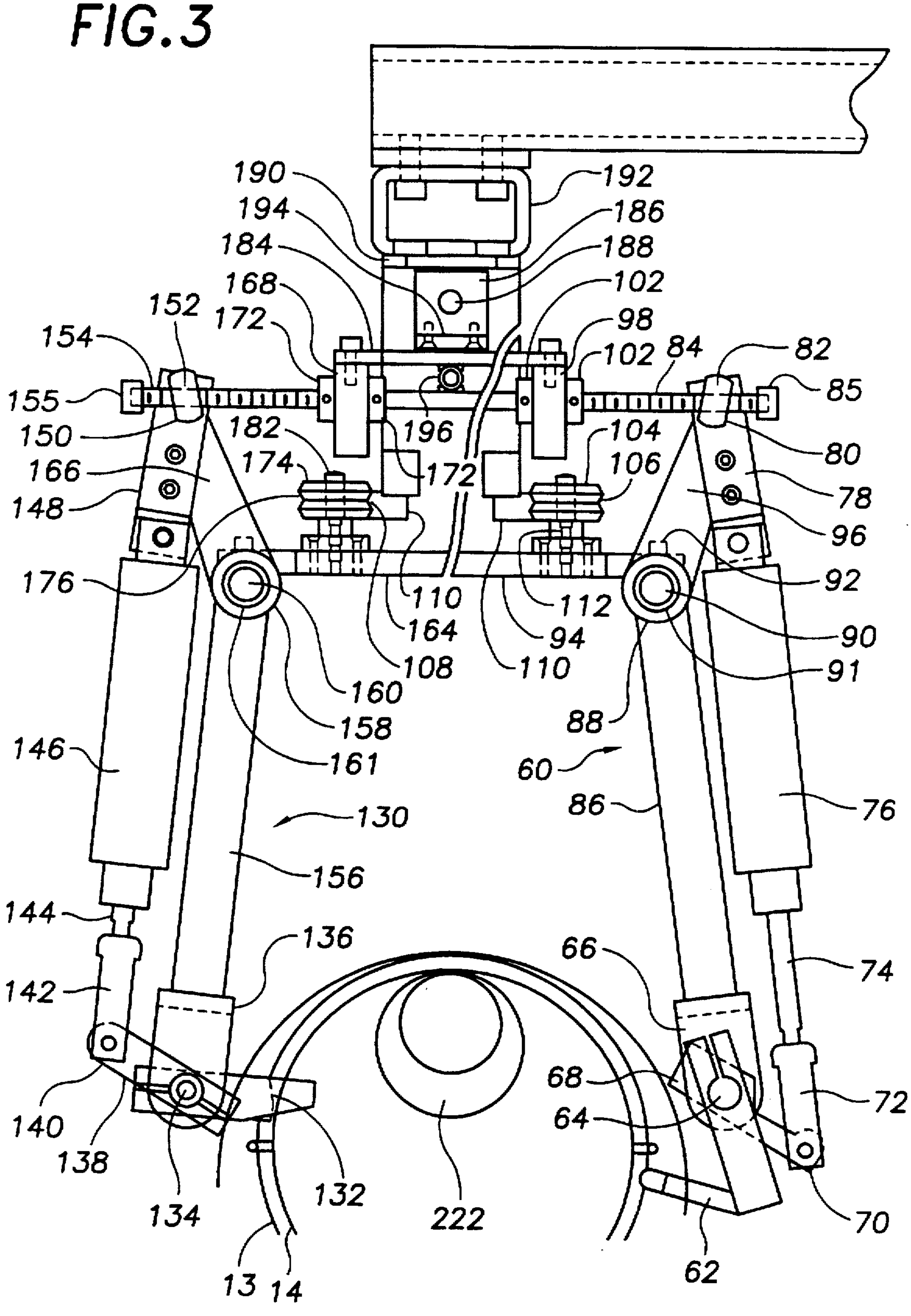
FIG. 3 is an end elevational view of the apparatus of FIG. 1.

Referring to the figures, and initially to FIGS. 1–3 in detail, an apparatus 10 is shown for moving the pivoted handle 12 of a pail 14 out of the way during printing.

As shown best in FIG. 2, apparatus 10 includes an endless conveyor belt 16 extending at its forwardmost end around a pulley 18, and extending at its rearwardmost end around another pulley (not shown). Further, intermediary tensioning rollers (not shown) are provided for tensioning endless conveyor belt 16 around pulley 18. Pulley 18 is mounted on a common shaft 20 with a sprocket 22. An endless timing belt 24 extends around sprocket 22 and a timing pulley 26. A motor (not shown) drives timing pulley 26 through a gear box 28. In this manner, a stack of horizontally oriented pails 14 are conveyed by conveyor belt 16, each pail inserted in the next, as shown in FIG. 1.

A conveyor table 30 is provided forwardly of pulley 18, so that continued conveying by conveyor belt 16 will force the stack of pails 14 to travel from conveyor belt 16 and onto and along conveyor table 30.

The stack is prevented from traveling past a set position along conveyor table 30, and is thereby stopped thereat, by a lower stopper mechanism 32. In this regard, a horizontally oriented elongated slot 34 is provided in conveyor table 30. Mechanism 32 includes a slide block 36 having a plurality of pins 38 that are inserted within slot 34 so as to permit sliding movement of slide block 36 within slot 34. In addition, slide block 36 can be tightened by a locking handle (not shown) so as to fix slide block 36 at any desired position.

A support block 40 is secured by bolts 42 to slide block 36 for movement therewith, and a cylinder mounting plate 44 is secured by bolts 45 to the lower end of support block 40. A cylinder 46 is mounted on the upper surface of cylinder mounting plate 44 and includes an upwardly extending piston rod 48. A block stop 50 is mounted to the upper end of piston rod 48. When piston rod 48 is extended upwardly, as shown in FIG. 1, the upper lip 13 of the forwardmost pail 14 of the stack abuts against block stop 50 to prevent further movement of the stack. On the other hand, when piston rod 48 is retracted, as shown in FIG. 2, the first or forwardmost pail 14 is no longer restrained from movement. Numeral 52 represents a side guide rail for guiding the stack of pails.

In order to remove the first or forwardmost pail 14 from the stack, while restraining the stack, two upper stopper mechanisms 60 are provided to restrain the second pail 14 of the stack, while permitting removal of the first or forward-most pail 14 of the stack. Mechanisms 60 are on opposite sides of the stack of pails. Only one such mechanism 60 will now be described, with the other being identical in structure. FIG. 1 and the right side of FIG. 3 show an entire mechanism 60, while FIG. 2 shows only a portion thereof, partly shown in section.

Mechanism 60 includes a lever arm 62 fixedly mounted to the end of a rotatable shaft 64 for rotating lever arm 62 between a blocking position in front of the upper lip 13 of a pail 14 and a non-blocking position out of the way of pail 14. This arrangement is shown at the right side of FIG. 3, for the sake of expediency in the drawings. Shaft 64 is rotatably mounted to the lower arms of an inverted U-shaped yoke 66. An actuating arm 68 is also fixedly mounted to shaft 64 and has a free end 70 pivotally connected to a clevis 72 at the end of a piston rod 74 extending from a cylinder 76. As will be understood from the discussion hereinafter, and as shown in FIG. 3, when piston rod 74 is extended, actuating arm 68 is rotated, causing rotation of shaft 64, and thereby, rotation of lever arm 62 into blocking relation to the second pail 14 of the stack. When piston rod 74 is retracted, lever arm 62 is rotated out of this blocking position. Movement of piston arm 74 is controlled by an upper port 73 and a lower port 75 of cylinder 76.

The upper end of cylinder 76 is pivotally connected to the lower end of a plate 78. An adjustment plate 80 is transversely connected to plate 78 at the upper end thereof, and includes a threaded opening 82, through which a threaded shaft 84 extends. Thus, when threaded shaft 84 is rotated, adjustment plate 80 is moved outwardly or inwardly along threaded shaft 84. Threaded shaft 84 is common to both mechanisms 60, with one opening 82 having a right handed thread and the other opening 82 having a left handed thread. Thus, as threaded shaft 84 is rotated, both adjustment plates 80 on opposite sides of the pails 14 move in synchronism outwardly or inwardly. A screw drive 85 is secured to one end of threaded shaft 84 for rotating the same.

A support shaft 86 has its lower end fixed to the upper connecting portion of yoke 66 and its upper end fixed to a rotatable cylinder 88. As best shown in FIG. 2, cylinder 88 is rotatably mounted on a shaft 90, with a bearing member 91 interposed therebetween and also extending from opposite ends of cylinder 88. The opposite ends of shaft 90 are fixed by bolts 92 to an elongated plate 94. The opposite ends of the shaft 90 of the other mechanism 60 are secured to the opposite end of elongated plate 94. Further, cylinder 88 is fixed to plate 78 by a connecting plate 96, as shown in FIG. 3.

In this manner, when threaded shaft 84 is rotated, the adjustment plates 82 move inwardly or outwardly. As a result, the inclination angle of cylinders 76 change. Because plate 78 is connected to cylinder 88, the inclination angle of support shaft 86 thereby changes, thus moving yoke 66 inwardly or outwardly. The above operation results in the free end of lever arm 62 moving inwardly or outwardly, to adjust for different size pails 14.

It will be appreciated that, during this inward or outward movement of adjustment plates 82, and assuming that piston rod 74 extends by the same amount, it will be necessary to adjust the height of threaded rod 84 to account for the different angulations. Accordingly, threaded rod 84 extends through two blocks 98 at opposite sides of apparatus 10. Each block 98 includes a vertically elongated slot 100 shown in dashed lines in FIGS. 1 and 2. Threaded rod 84 is restrained from axial movement by two collars 102 fixed thereto on the opposite sides of each block 98. Thus, as threaded rod 84 rotates, thereby changing the angulation of mechanisms 60, threaded rod 84 moves up and down within vertically elongated slots 100.

In order to adjust the position of mechanisms 60, two rollers 104, are provided on each side of apparatus 10. Each roller 104 has a V-shaped indent 106 which engages a V-shaped edge 108 of a track 110. Each roller 104 is mounted to a central, vertically oriented, axial shaft 112 that is rotatably journaled to elongated plate 94.

In order to lock mechanisms 60 at a set position, that is, to prevent movement in the axial direction of the pails 14, a plate 114 is fixed to plate 94 and extends vertically upwards therefrom. Plate 114 includes a vertically elongated slot 116 therein, along with a locking clamp 118 within slot 116 for clamping to a support rail 120 for track 110. A handle 122 can be provided for assisting in the clamping and unclamping operations. This arrangement is not shown in FIG. 3 for the sake of clarity of the drawings.

Before starting an operation, lower stopper mechanism 32 and upper stopper mechanisms 60 are set in the respective positions shown in FIGS. 1 and 2.

In order to disengage the first pail 14 from the stack, while the second pail 14 of the stack is held by lever arm 62, puller/pusher mechanisms 130 are provided, for movement along track 110. Mechanisms 130 are on opposite sides of apparatus 10. Only one such mechanism 130 will now be described, with the other being identical in structure. Puller/pusher mechanism 130 is shown in FIG. 1 and at the left side of FIG. 3.

Mechanism 130 includes a pulling lever arm 132 fixedly mounted to the end of a rotatable shaft 134 for rotating lever arm 132 between a pulling position immediately behind the upper lip 13 of a pail 14 and a non-pulling position out of the way of pail 14. Shaft 134 is rotatably mounted to the lower arms of an inverted U-shaped yoke 136. An actuating arm 138 is also fixedly mounted to shaft 134 and has a free end 140 pivotally connected to a clevis 142 at the end of a piston rod 144 extending from a cylinder 146. As will be understood from the discussion hereinafter, and as shown in FIG. 3, when piston rod 144 is extended, actuating arm 138 is rotated, causing rotation of shaft 134, and thereby, rotation of lever arm 132 into a position behind the lip 13 of the first pail 14 of the stack. When piston rod 144 is retracted, lever arm 132 is rotated out of this position, that is, away from the pail 14. Movement of piston rod 144 is controlled by an upper port 143 and a lower port 145 of cylinder 146.

The upper end of cylinder 146 is pivotally connected to the lower end of a plate 148. An adjustment plate 150 is transversely connected to plate 148 at the upper end thereof, and includes a threaded opening 152, through which a threaded shaft 154 extends. Thus, when threaded shaft 154 is rotated, adjustment plate 150 is moved outwardly or inwardly along threaded shaft 154. Threaded shaft 154 is common to both mechanisms 130, with one opening 152 having a right handed thread and the other opening 152 having a left handed thread. Thus, as threaded shaft 154 is rotated, both adjustment plates 150 on opposite sides of the pails 14 move in synchronism outwardly or inwardly. A screw drive 155 is secured to one end of threaded shaft 154 for rotating the same.

A support shaft 156 has its lower end fixed to the upper connecting portion of yoke 136 and its upper end fixed to a rotatable cylinder 158. As best shown in FIG. 1, cylinder 158 is rotatably mounted on a shaft 160, with a bearing member 161 interposed therebetween and also extending from opposite ends of cylinder 158. The opposite ends of shaft 160 are fixed by bolts 162 to an elongated plate 164. The opposite ends of the shaft 160 of the other mechanism 130 are secured to the opposite end of elongated plate 164. Further, cylinder 158 is fixed to plate 148 by a connecting plate 166, as shown in FIG. 3.

In this manner, when threaded shaft 154 is rotated, the adjustment plates 152 move inwardly or outwardly. As a result, the inclination angle of cylinders 146 change. Because plate 148 is connected to cylinder 158, the inclination angle of support shaft 156 thereby changes, thus moving yoke 136 inwardly or outwardly. The above operation results in the free end of lever arm 132 moving inwardly or outwardly, to adjust for different size pails 14.

It will be appreciated that, during this inward or outward movement of adjustment plates 152, and assuming that piston rod 144 extends by the same amount, it will be necessary to adjust the height of threaded rod 154 to account for the different angulations. Accordingly, threaded rod 154 extends through two blocks 168 at opposite sides of apparatus 10. Each block 168 includes a vertically elongated slot 170 shown in dashed lines in FIG. 1. Threaded rod 154 is restrained from axial movement by two collars 172 fixed thereto on the opposite sides of each block 168. Thus, as threaded rod 154 rotates, thereby changing the angulation of mechanisms 130, threaded rod 154 moves up and down within vertically elongated slots 170.

In order to adjust the position of mechanisms 130, two rollers 174, are provided on each side of apparatus 10. Each roller 174 has a V-shaped indent 176 which engages V-shaped edge 108 of track 110. Each roller 174 is mounted to a central, vertically oriented, axial shaft 182 that is rotatably journaled to elongated plate 164.

Puller/pusher mechanism 130 is movable along track 110 from a position at which lever arm 132 engages behind the lip 13 of the first pail 14 of the stack for pulling the first pail 14 from the stack, to the position shown in FIG. 1, and back again. Accordingly, when the second pail 14 of the stack is held by lever arm 62, lever arm 132 can pull the first pail 14 from the stack.

In order to move puller/pusher mechanism 130 between such positions, blocks 168 are secured to the underside of a plate 184, as shown in FIG. 3. A rodless cylinder 186 is slidably mounted on a beam 188 that is secured at opposite ends by brackets 190 to an upper frame member 192. A cylinder plate 194 is secured to the underside of rodless cylinder 186, and a screw adjustment rod 196 connects cylinder plate 194 to plate 184. Thus, as rodless cylinder 186 is moved along beam 188, it moves puller/pusher mechanism 130 therewith.

When the first pail 14 is to be pulled from the stack, the handles 12 are generally positioned rearwardly, as shown in FIG. 1. As a result, the handle 12 of the first pail 14 may catch on the lip 13 of a rearwardly positioned pail 14, causing problems with the disengagement.

In accordance with an aspect of the present invention, a brush roller 200 is rotatably mounted on a shaft 202 immediately above and in contact with the free end of the handle 12 of the first pail 14 of the stack, as shown in FIG. 1. Shaft 202 is rotated by means of a motor 204 in the clockwise direction of FIG. 1. As a result, the handle 12 of the first pail 14 is moved upwardly to the vertically oriented dot-dash line position of FIG. 1.

At such position, there are various flexible spring fingers 206, made of plastic or other material, which are supported by a support 208 so as to hang vertically down therefrom. When the handle 12 is moved to the dot-dash position, some of the spring fingers 206 are forced behind handle 12, while other spring fingers 206 remain in front of handle 12, thereby releasably capturing or temporarily holding handle 12. In this position, handle 12 cannot get caught on the lip 13 of any rearwardly positioned pails 14, and thus, the first pail 14 can be easily removed from the stack.

As the first pail 14 is removed from the stack, the fingers 206 which are located forwardly of the handle 12, force the handle 12 rearwardly back onto the main body of the first pail 14 that is removed.

After removal of the first pail 14 from the stack, puller/pusher mechanism 130 moves the first pail to the position X in FIG. 1. At the same time, the pail previously at position X is moved forwardly to position Y in FIG. 1.

To accomplish this, puller/pusher mechanism 130 further includes a pusher lever arm 210 fixed to the opposite end of rotatable shaft 134 from the position at which lever arm 132 is fixed. When lever arm 132 of puller/pusher mechanism 130 is moved from the position of the stack to the position X, lever arm 210 abuts against the bottom surface of the pail 14 then at position X, and pushes that pail 14 forwardly, to the position Y onto a mandrel assembly 220. Mandrel assembly 220 is one of a plurality of similar mandrel assemblies 220 mounted on the periphery of a rotatable turret (not shown), as is well known.

Figure 4:
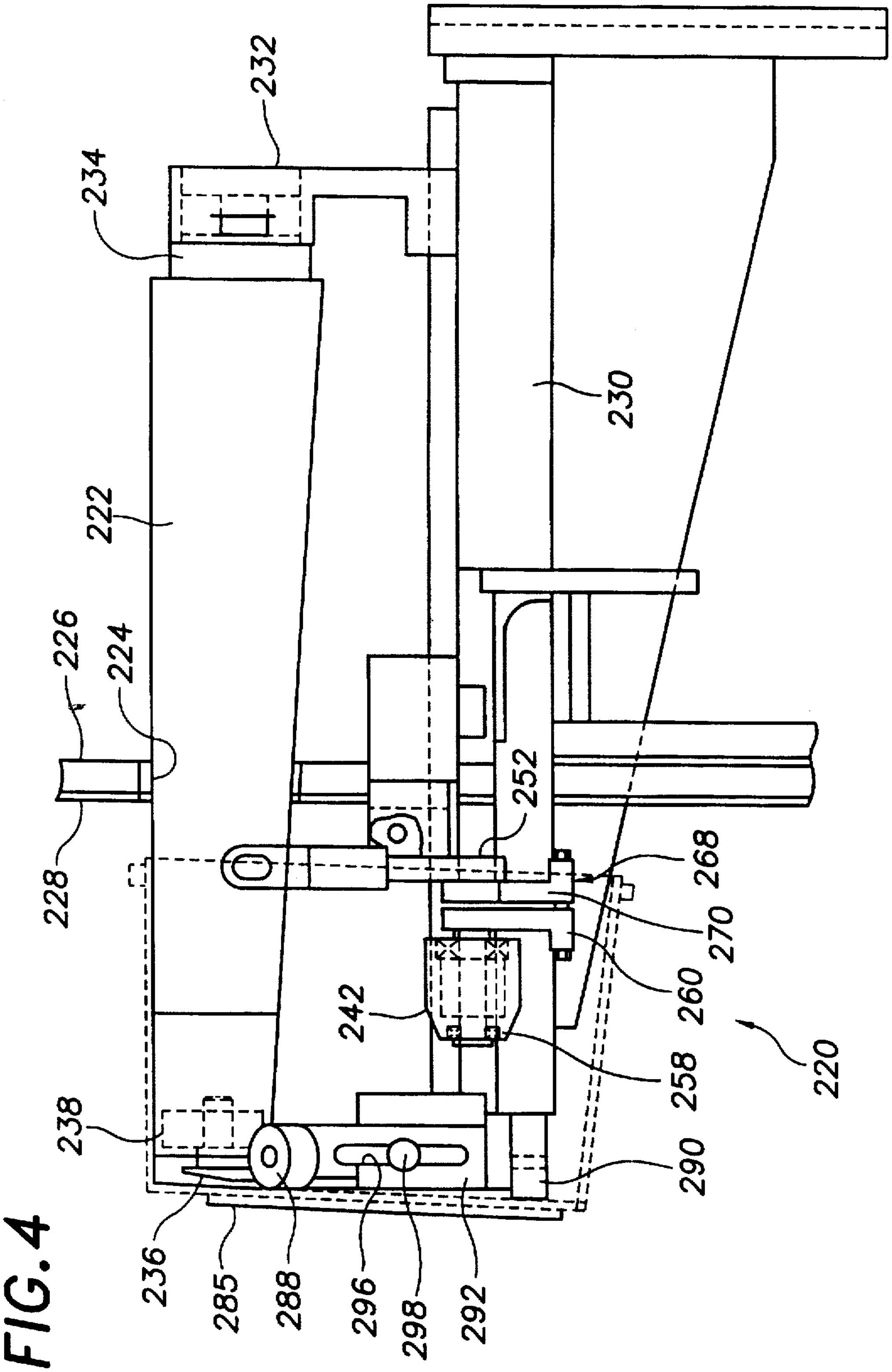
FIG. 4 is a right side elevational view of the mandrel assembly.

Referring now to FIG. 4, mandrel assembly 220 includes a tapered mandrel 222 which is oriented such that the upper surface thereof in the side elevational view is parallel to the ground, and the lower surface thereof is inclined. Accordingly, a pail 14 is pushed onto mandrel 222 by lever arm 210. Mandrel 222 extends through an opening 224 in a circular backstop 226 that has a circular front plate 228 mounted thereon, also having a corresponding opening through which mandrel 222 extends.

A T-beam 230 extends below mandrel 222 in parallel, spaced relation thereto, with T-beam 230 functioning to support mandrel 222 in such relation. T-beam 230 also extends through openings in backstop 226 and front plate 228. Specifically, a rear post 232 extends upwardly from the rear of T-beam 230, with the rear of mandrel 222 rotatably supported at the upper end of rear post 232 by means of a bearing assembly 234. Further, a front post 236 extends upwardly from the front of T-beam 230, with the front of mandrel 222 rotatably supported at the upper end of front post 236 by means of a bearing assembly 238.

In order to retain pail 14 on mandrel 222, two idler rollers 240 and 242 are provided, such that the angular distance between each idler roller 240 and 242, and mandrel 222 is preferably approximately 120°, thereby providing a three point securement, while also permitting rotation of pail 14 on mandrel 222.

Figure 6:
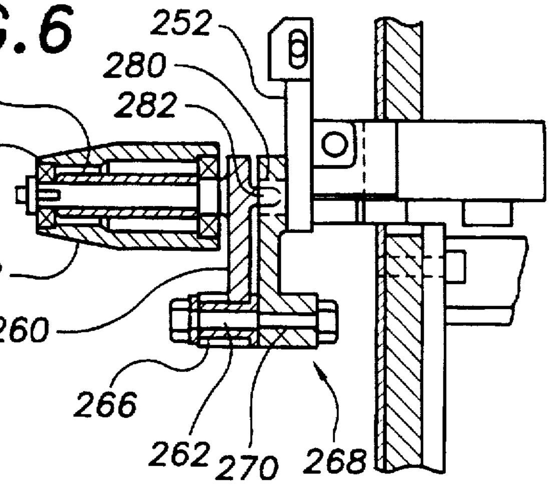
FIG. 6 is a vertical cross-sectional view of the idler roller assembly of FIG. 5.
Figure 5:
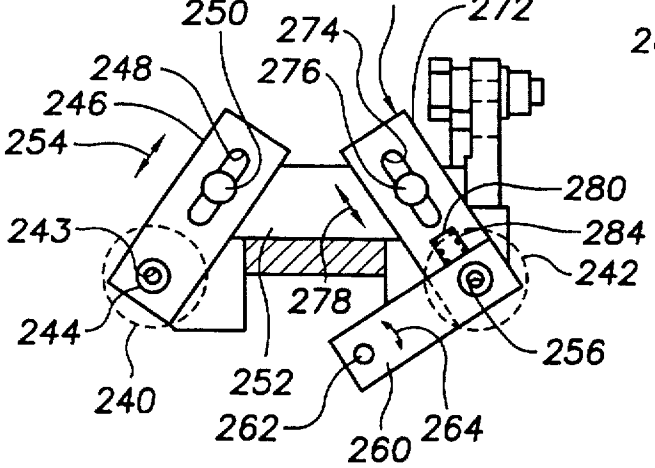
FIG. 5 is an end elevational view, partly in section, of the idler roller assembly.

As shown best in FIGS. 4–6, idler roller 240 is rotatably mounted on a shaft 243 by means of bearings 244. Shaft 243 is fixed to a roller adjustment arm 246 having a lengthwise extending elongated slot 248. A bolt 250 extends through slot 248 and into engagement with a frame support 252 mounted to T-beam 230. Accordingly, the position of idler roller 240 can be adjusted in the direction of arrow 254 of FIG. 5.

Idler roller 242 is also mounted on a shaft 256 by means of bearings 258. Shaft 256, in turn, is mounted to the end of a spring loaded arm 260. Arm 260 has its opposite end connected for rotation around a pivot pin 262 in the direction of arrow 264. A flange bushing 266 is in surrounding relation to pivot pin 262.

An L-shaped roller adjustment arm 268 is provided, having a first leg 270 in parallel relation to spring loaded arm 260 and a second leg 272 transverse thereto. The opposite end of pivot pin 262 extends through an opening in the free end of first leg 270 of roller adjustment arm 268. In this manner, spring loaded arm 260 and roller adjustment arm 268 are pivotally movable with respect to each other, around pivot pin 262.

Second leg 272 is similar to roller adjustment arm 246 and is arranged with an orientation that is a mirror image thereof. Second leg 272 has a lengthwise extending elongated slot 274. A pin 276 extends through slot 274 and into engagement with frame support 252 mounted to T-beam 230. Accordingly, the position of idler roller 242 can be adjusted in the direction of arrow 278 of FIG. 5.

In addition, a recess 280 is formed in second leg 272 and part of first leg 270. A pin 282, which is coaxial with shaft 256, extends rearwardly from the free end of spring loaded arm 260 into recess 280, to thereby limit the pivotal movement of spring loaded arm 260 about pivot pin 262. In addition, a coil spring 284 is positioned in recess 280 to normally bias spring loaded arm 260, and thereby idler roller 242 outwardly.

In this manner, roller adjustment arms 246 and 268 are moved, by adjusting the position of bolts 250 and 276 in elongated slots 248 and 278, to adjust for different size pails 14. It will be appreciated that the rearward portions of idler rollers 240 and 242 are beveled. Thus, as a pail 14 is pushed forwardly, idler roller 242 is pushed slightly inwardly against the force of coil spring 284. Idler roller 242 is constantly pushed by coil spring 284 to provide contact with the inner surface of pail 14, and thereby, a three point contact is made with pail 14.

As will be understood from the description hereinafter, when pail 14 is mounted on mandrel assembly 220, the turret is rotated so that, at the next station, pail 14 is rotated around mandrel 222 and idler rollers 240 and 242. This can be accomplished by a suction device 285 (FIG. 4) on the bottom of the pail 14 which also provides rotation thereof, or any other suitable means. The reason that rotation occurs at the next station is because the puller/pusher mechanism 130 and other assemblies are in the way at the loading station.

Figure 7:
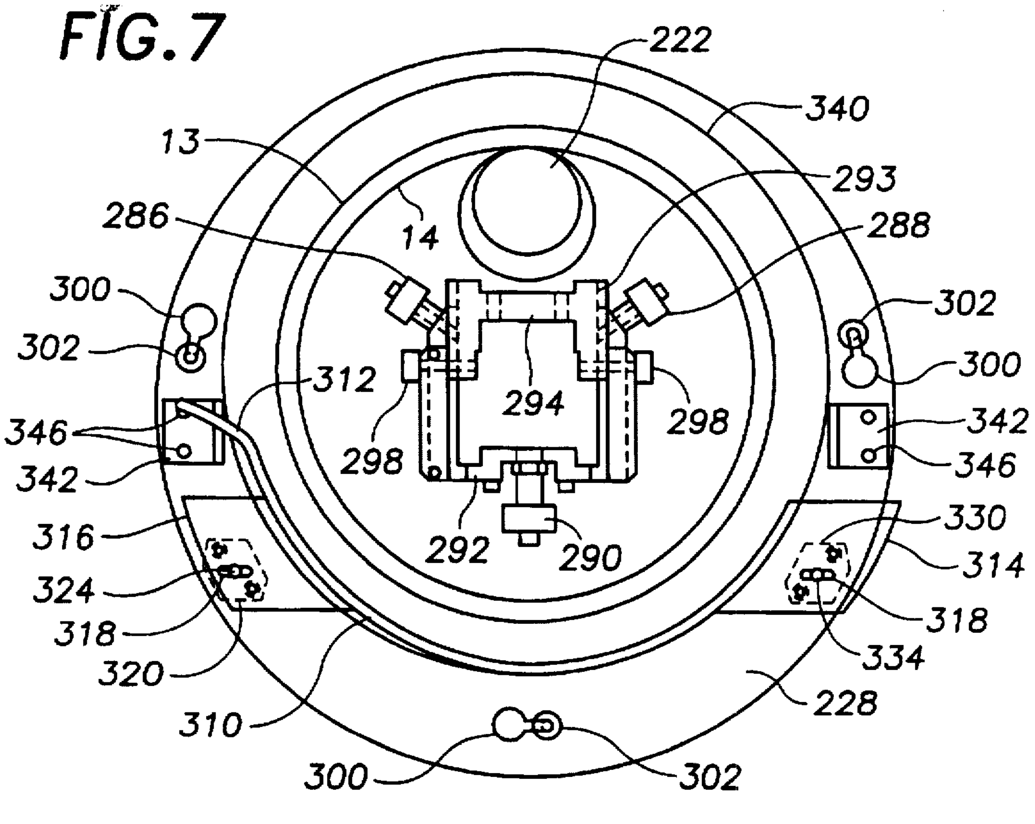
FIG. 7 is an elevational view of the backstop, retainer band, helix rod, and the mechanism to prevent binding of the bottom of the pail during rotation, showing the U-shaped bracket thereof in its lowest position, and with the idler roller assembly omitted for clarity.

In order to prevent binding of the bottom of pail 14 during such rotation, mandrel assembly 220 further includes three equiangularly spaced cam follower rollers 286, 288 and 290 for rolling on the inner surface of the bottom of pail 14. As shown in FIGS. 4 and 7, a U-shaped bracket 292 is provided for rotatably supporting rollers 286, 288 and 290, with rollers 286 and 288 being rotatably mounted to the upper corners of bracket 292 and roller 290 mounted to a center lower portion of bracket 292. Rollers 286, 288 and 290 are mounted so as to extend away from bracket 292 and such that their rotational axes are transverse to the central axis of pail 14, so that they can roll on the bottom of pail 14.

Figure 8:
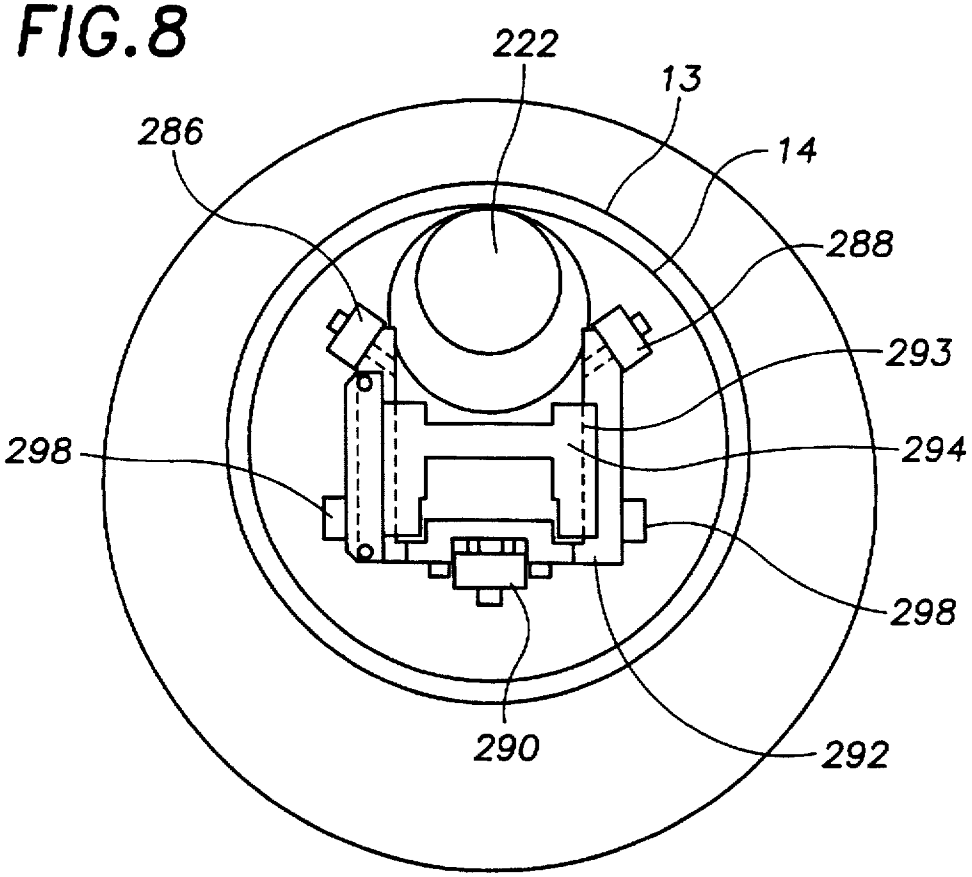
FIG. 8 is an elevational view similar to FIG. 7, but only showing the backstop and mechanism to prevent binding of the bottom of the pail during rotation, with the U-shaped bracket thereof in its uppermost position.

The opposite side legs of U-shaped bracket 292 each slidably fit within an elongated recess 293 at opposite sides of a bracket 294 that is secured to front post 236, for movement in the vertical direction. Each side leg includes an elongated slot 296 therein, and a bolt 298 extends through each elongated slot 296 into threaded engagement with bracket 294 to secure U-shaped bracket 292 at any desired vertical position. As a result, U-shaped bracket 292 can be adjusted to locate rollers 286, 288 and 290 at the center of the diameter of the bottom of the pail 14, and can therefore be adjusted for different size pails 14. FIG. 7 shows U-shaped bracket 292 in its lowest possible position for a large diameter pail 14, while FIG. 8 shows U-shaped bracket 292 in its uppermost position for a small diameter pail 14.

In accordance with an aspect of the present invention, means are provided for moving the handle 12 from its rearward inclination to a forward inclination, and removably holding the handle 12 in such position.

Figure 9:
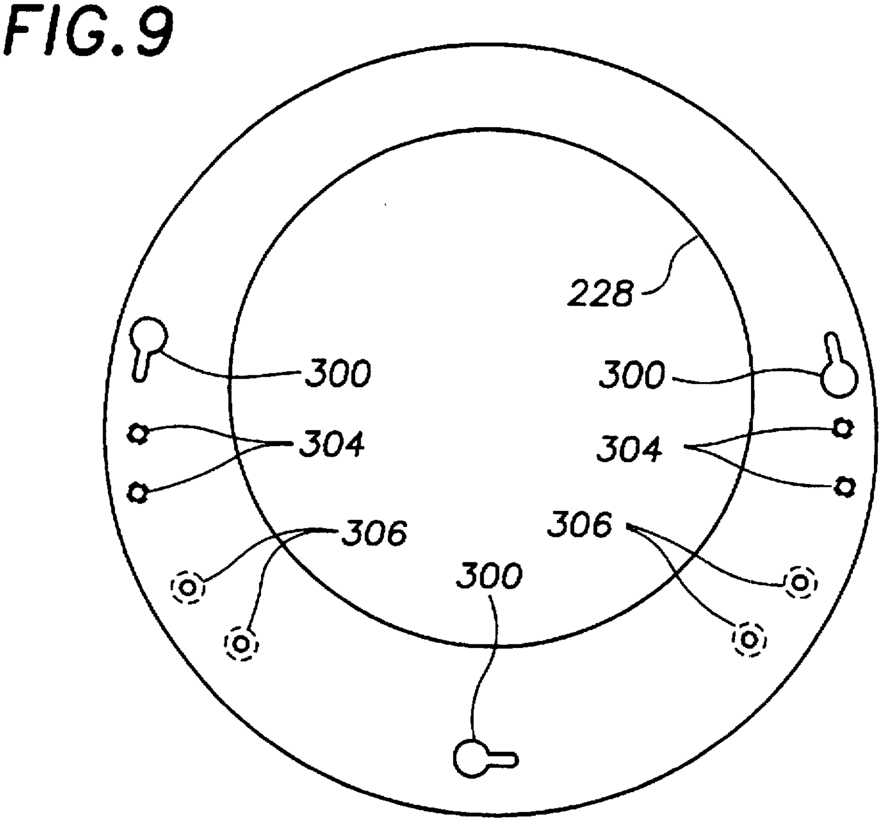
FIG. 9 is a plan view of the front plate to be secured to the backstop.

Specifically, as discussed above, a circular front plate 228 is mounted on circular backstop 226. In this regard, as shown in FIGS. 7 and 9, front plate 228 includes three equiangularly arranged openings 300 which receive tightening bolts 302 extending from backstop 226 so that front plate 228 is held flush against backstop 226. Front plate 228 further includes two diametrically opposite sets of two threaded openings 304 and two further sets of two threaded countersunk openings 306 at opposite sides thereof and below openings 304, the purpose for which will be explained hereinafter.

As shown in FIGS. 7 and 10–12, a helix rod 310 is secured to a lower portion of circular front plate 228 for an angular distance of about 165°. Helix rod 310 preferably extends around an arc slightly larger than a diameter of a largest size pail that can be rotatably supported by mandrel assembly 220. Helix rod 310 includes an outwardly bent end 312, and two securement flanges 314 and 316 at opposite ends thereof. Each securement flange 314 and 316 includes an elongated slot 318 therein.

Figure 13:
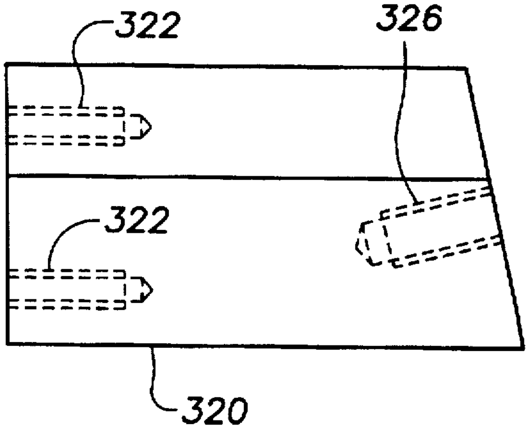
FIG. 13 is a side elevational view of the left cam block.
Figure 14:
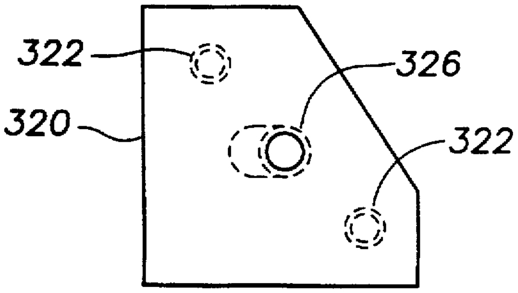
FIG. 14 is an end elevational view of the left cam block of FIG. 13.

A left cam block 320 is mounted to the front surface of front plate 228 by means of bolts (not shown) extending through threaded countersunk openings 306 into engagement with threaded openings 322 of left cam block 320, as shown in FIGS. 7, 13 and 14. A bolt 324 extends through elongated slot 318 of securement flange 316 into engagement with a threaded opening 326 on the opposite side of left cam block 320 to secure one end of helix rod 310 to front plate 228.

Figure 15:
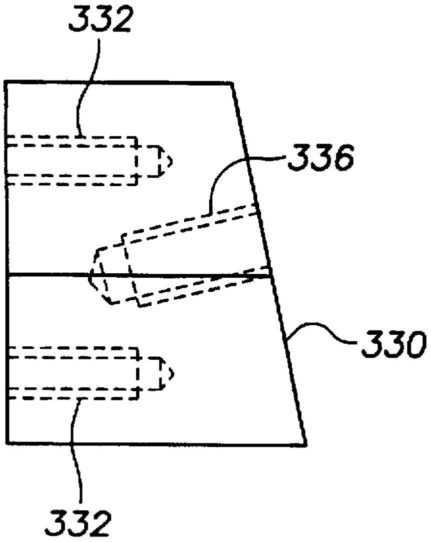
FIG. 15 is a side elevational view of the right cam block.
Figure 16:
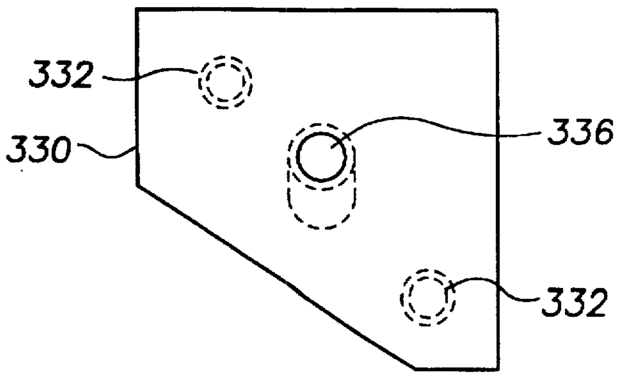
FIG. 16 is an end elevational view of the right cam block of FIG. 15.

In like manner, as shown in FIGS. 7, 15 and 16, a right cam block 330 is mounted to the front surface of front plate 228 by means of bolts (not shown) extending through threaded countersunk openings 306 into engagement with threaded openings 332 of left cam block 330. A bolt 334 extends through elongated slot 318 of securement flange 314 into engagement with a threaded opening 336 on the opposite side of left cam block 330 to secure the opposite end of helix rod 310 to front plate 228.

As shown best in FIGS. 13–16 and 17, the height of left cam block 326 is greater than that of right cam block 336. As a result, rod 310 assumes a part-helical configuration.

Helix rod 310 and cam blocks 320 and 330 are not shown in FIG. 4 for the sake of clarity in the drawing.

With this arrangement, after a pail 14 has been inserted onto mandrel assembly 220, and the turret holding mandrel assembly 220 has been rotated to the next position, pail 14 is rotated by any suitable means, such as a suction device 285 at the bottom of the pail 14. During this rotation, bent end 312 of helix rod 310 engages one end of handle 12 at a position on handle 12 adjacent to its pivotal securement to pail 14. Because of this position of engagement, handle 12 is engaged by bent end 312, regardless of the orientation of handle 12, that is, whether it extends rearwardly, forwardly or inbetween.

As pail 14 is further rotated, handle 12 is engaged to the inside of helix rod 310 and rides therealong. Because the spacing between helix rod 310 and front plate 228 reduces from the entry end of helix rod 310 to the opposite end thereof, as shown best in FIG. 17, the orientation of handle 12 changes from a rearward orientation as shown by the pail 14 at position X in FIG. 1 to a forward orientation as shown by the pail 14 at position Y in FIG. 1. Thus, there is no need for any pusher at the sides of the pail, to orient the handle forwardly of the upper edge of the pail, and thus, the disadvantages thereof are avoided.

Further, because helix rod 310 engages handle 12 at an end thereof which is immediately adjacent pail 14, the orientation of handle 12 can be controlled, regardless of the initial position of handle 12, that is, even if handle 12 is oriented forwardly or at any other position thereof.

In addition, a retainer band 340 is provided on the upper portion of front plate 228 to releasably hold handle 12 in the forward oriented position of the pail shown at position Y in FIG. 1.

Figures 10, 11, 12, 18, 19:
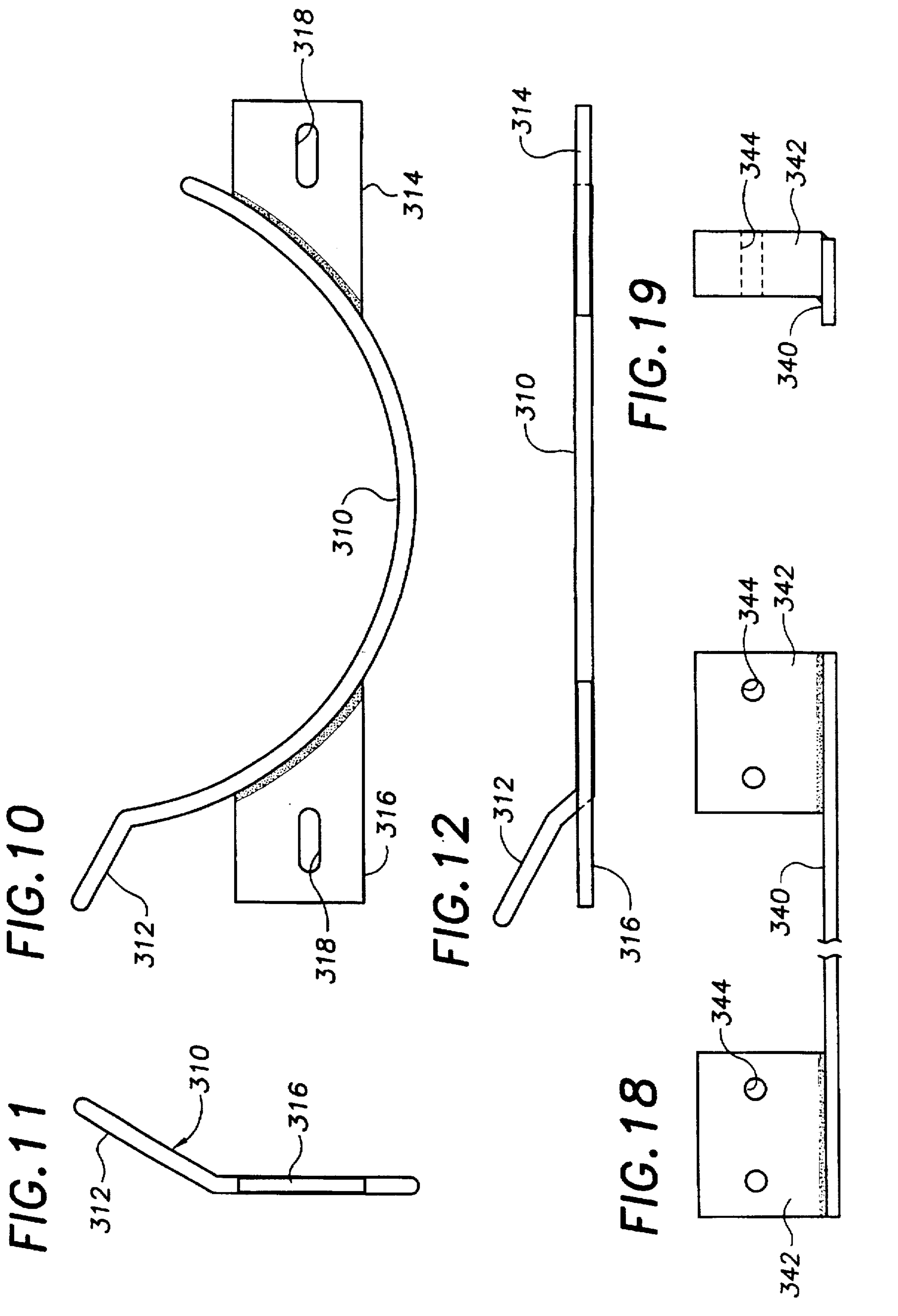
FIG. 10 is a top plan view of the helix rod.
FIG. 11 is an end elevational view of the helix rod of FIG. 10.
FIG. 12 is a side plan view of the helix rod of FIG. 10.
FIG. 18 is a side elevational view of the retainer band.
FIG. 19 is an end elevational view of the retainer band of FIG. 18.
Figure 17:
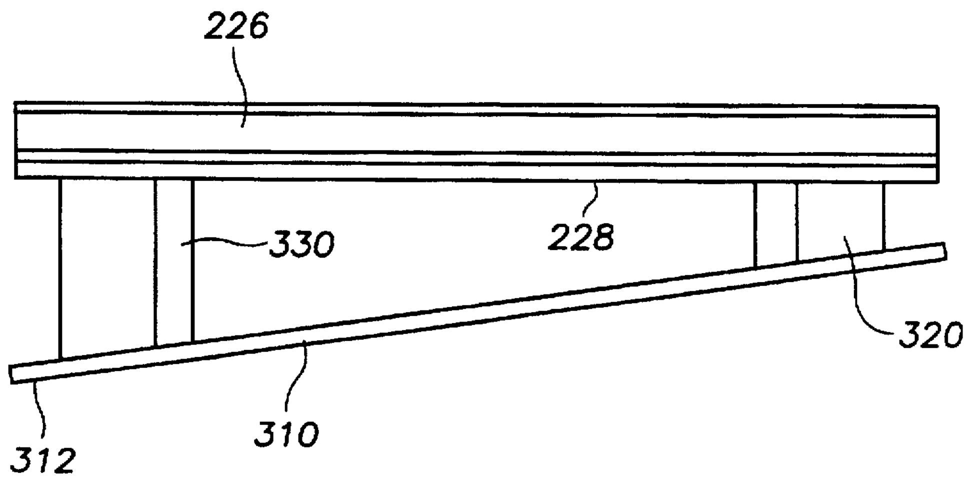
FIG. 17 is a top plan view showing the helix rod connected to the backstop.

Specifically, as shown in FIGS. 7, 18 and 19, retainer band 340 is preferably formed as a flexible, spring steel member, having retainer blocks 342 at opposite ends thereof. Each retainer block 342 includes a pair of through holes 344 therein. Bolts 346 are inserted through holes 344 into engagement with threaded openings 304 in front plate 228. It will be appreciated that, in order to provide such securement, retainer band 340 must be bent in an arcuate manner.

During the rotation of pail 14 on mandrel assembly 220, the handle 12 thereof is rotated with pail 14 and also is forced forwardly with the helical arrangement of helix rod 310. During such rotation, handle 12 is forced within retainer band 340 and when the rotation is completed, handle 12 is oriented at 0° and is engaged by retainer band 340, as shown in FIG. 1.

After printing on pail 14 has been completed, it is only necessary to push the handle 12 rearwardly by any suitable means (not shown). Because retainer band 340 is a flexible band, and because handle 12 is made from plastic, handle 12 can easily be removed by slight bending of retainer band 340 and/or handle 12, without first pulling pail 14 rearwardly.

Figure 20:
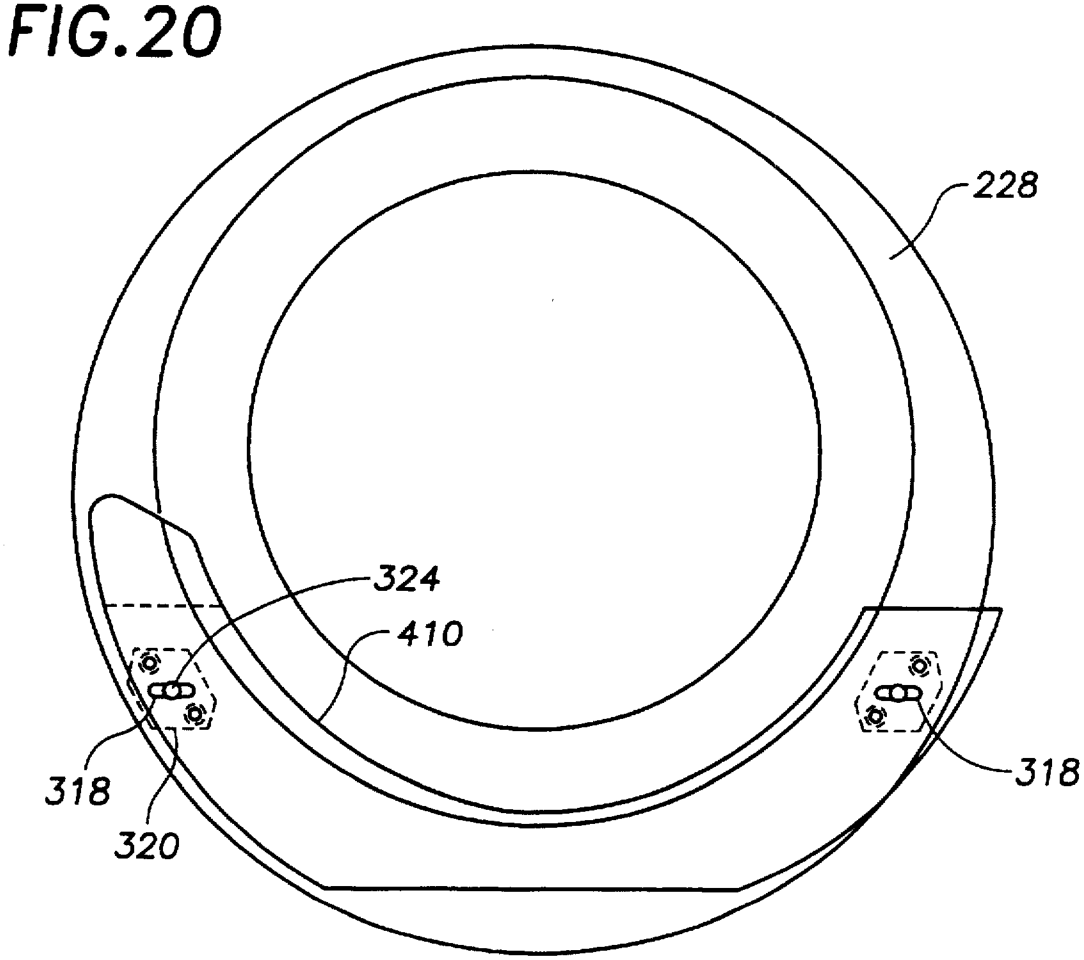
FIG. 20 is an elevational view of the backstop and an alternative embodiment of a helix plate.

It will be appreciated that various modifications and equivalents can be provided within the scope of the present invention. For example, as shown in FIG. 20, helix rod 310 can be replaced with a helix plate 410 which functions in the same manner. In such case, securement flanges 314 and 316 are eliminated.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. An apparatus for positioning a handle of a pail for a printing operation on the pail, said apparatus comprising:

a mandrel assembly for rotatably supporting a pail thereon, said mandrel assembly including a backstop;

a retainer band mounted to said backstop; and a helix member mounted to said backstop at a position different from said retainer band and engaging a handle of the pail during rotation of the pail on the mandrel assembly so as to automatically move said handle to a position within and releasably engaged by said retainer band.

2. An apparatus according to claim 1, wherein said helix member extends around an arc slightly larger than a diameter of a specific size pail that is being rotatably supported by said mandrel assembly.

3. An apparatus according to claim 1, further including a first block for securing one end of said helix member to said backstop and a second block for securing an opposite end of said helix member to said backstop, with said first block having a height greater than a height of said second block such that a distance of said one end of said helix member to said backstop is greater than a distance from said opposite end of said helix member to said backstop.

4. An apparatus according to claim 1, wherein said helix member is in the shape of a rod.

5. An apparatus according to claim 1, wherein said helix member is in the shape of a flat plate.

6. An apparatus according to claim 1, wherein said helix member has an input end that is bent outwardly with respect to a remainder of said helix member.

7. An apparatus according to claim 1, wherein said retainer band is a flexible spring member that is formed in an arcuate configuration.

8. An apparatus according to claim 7, wherein said retainer band is formed as a flat spring steel member that is bent into said arcuate configuration, and includes retainer members at opposite ends thereof for securing the retainer band in said bent, arcuate configuration to said backstop.

9. An apparatus according to claim 1, wherein:

said helix member is positioned at a lower portion of said backstop, and said retainer band is positioned at an upper portion of said backstop.

10. An apparatus according to claim 1, further comprising a front plate secured to said backstop, with said retainer band and said helix member mounted to said backstop via said front plate.

11. An apparatus for positioning a handle of a first pail in a stack of pails to prevent engagement of the handle with subsequent pails of the stack, during disengagement of the first pail from the stack, said apparatus comprising:

a brush roller mounted in contact with a free end of a handle of a first pail of a stack of pails;

a motor connected with the brush roller for rotating the brush roller so as to move the free end of the handle of the first pail to a first position out of engagement with remaining ones of the pails of the stack; and a temporary holding device positioned at said first position which releasably holds the handle in said first position, and releases said handle of the first pail after disengagement of the first pail from the stack.

12. An apparatus according to claim 11, wherein said pails of said stack are oriented in a first direction, and the handle of the first pail temporarily held in said first position is oriented in a second direction substantially transverse to said first direction.

13. An apparatus according to claim 11, wherein said temporary holding device includes a plurality of spring fingers extending vertically down from a support at said first position.

14. An apparatus for positioning a pail for a printing operation on the pail, said apparatus comprising:

a mandrel assembly for rotatably supporting a pail thereon, said mandrel assembly including a backstop;

a first stopper mechanism positioned adjacent a stack of pails for restraining a second pail and subsequent pails of the stack;

a track extending at least from said stack of pails to said mandrel assembly;

a puller mechanism movably mounted on said track and including a pulling arm for engaging a first pail of the stack and pulling said first pail from the stack while said first stopper mechanism holds said second pail and subsequent pails of the stack;

a brush roller mounted in contact with a free end of a handle of the first pail of the stack;

a motor connected with the brush roller for rotating the brush roller so as to move the free end of the handle of the first pail to a first position out of engagement with remaining ones of the pails of the stack;

a temporary holding device positioned at said first position which releasably holds the handle in said first position, and releases said handle of the first pail after disengagement of the first pail from the stack;

a pusher mechanism movably mounted on said track and including a pusher arm for engaging a bottom of said first pail of the stack which has been removed by said puller mechanism and pushing said removed first pail onto said mandrel assembly;

a retainer band mounted to said backstop; and a helix member mounted to said backstop at a position different from said retainer band and engaging a handle of the first pail during rotation of the first pail on the mandrel assembly so as to automatically move said handle to a position within and releasably engaged by said retainer band.

15. An apparatus according to claim 14, wherein said helix member extends around an arc slightly larger than a diameter of a specific size pail that is being rotatably supported by said mandrel assembly.

16. An apparatus according to claim 14, further including a first block for securing one end of said helix member to said backstop and a second block for securing an opposite end of said helix member to said backstop, with said first block having a height greater than a height of said second block such that a distance of said one end of said helix member to said backstop is greater than a distance from said opposite end of said helix member to said backstop.

17. An apparatus according to claim 14, wherein said helix member has an input end that is bent outwardly with respect to a remainder of said helix member.

18. An apparatus according to claim 14, wherein said retainer band is a flexible spring member that is formed in an arcuate configuration.

19. An apparatus according to claim 14, wherein:

said helix member is positioned at a lower portion of said backstop, and said retainer band is positioned at an upper portion of said backstop.

20. An apparatus according to claim 14, wherein said temporary holding device includes a plurality of spring fingers extending vertically down from a support at said first position.

* * * * *